United States Patent [19]
Hegler et al.

[11] Patent Number: 5,560,941
[45] Date of Patent: Oct. 1, 1996

[54] APPARATUS FOR THE MANUFACTURE OF CORRUGATED PIPES OF THERMOPLASTIC PLASTICS

[75] Inventors: Ralph-Peter Hegler, Bad Kissingen; Wilhelm Hegler, Goethestrasse 2, D-97688, Bad Kissingen, both of Germany

[73] Assignee: Wilhelm Hegler, Germany

[21] Appl. No.: 426,884

[22] Filed: Apr. 24, 1995

[30] Foreign Application Priority Data

Apr. 29, 1994 [DE] Germany .................. 44 14 977.8

[51] Int. Cl.⁶ .................................................. B29C 53/30
[52] U.S. Cl. .................. 425/185; 264/209.4; 264/286; 264/508; 425/186; 425/233; 425/326.100; 425/336; 425/395; 425/396
[58] Field of Search .......................... 425/233, 335, 425/336, 337, 326.1, 395, 327, 388, 396, 185, 183, 186; 264/209.4, 508, 286

[56] References Cited

U.S. PATENT DOCUMENTS 3,776,679  12/1973  Hegler .
4,212,618  7/1980  Hegler et al. .
4,381,276  4/1983  Hegler et al. ............... 425/336
4,787,598  11/1988  Rahn et al. ................. 425/335
5,002,478  3/1991  Lupke ........................ 425/396

FOREIGN PATENT DOCUMENTS 9311140  10/1993  Germany .
 971021   9/1964  United Kingdom .
94/07673   4/1994  WIPO .

*Primary Examiner*—Jay H. Woo
*Assistant Examiner*—Joseph Leyson
*Attorney, Agent, or Firm*—Laff, Whitesel, Conte & Saret, Ltd.

[57] ABSTRACT

An apparatus for the manufacture of corrugated pipes of thermoplastic plastics, which has circulating mold segment halves disposed in two opposite rows subsequent to an injection head, includes a wedge element for separating the mold segment halves. This wedge element is displaceable parallel to the direction of production. Further, grab equipments are provided to be displaceable, counter to the direction of production, by which one additional mold segment half at a time can be moved to the downstream end of a molding path, removed from the latter in the direction of production and moved into a parking position.

6 Claims, 3 Drawing Sheets

5,560,941

APPARATUS FOR THE MANUFACTURE OF CORRUGATED PIPES OF THERMOPLASTIC PLASTICS

BACKGROUND OF THE INVENTION

1. Field of the Invention

The invention relates to an apparatus for the manufacture of corrugated pipes of thermoplastic plastics comprising circulating mold segment halves, which are disposed in two opposite rows subsequent to an injection head and of which two at a time combine along a straight molding path to form a closed hollow mold, and which, on their inside, have inside walls forming the corrugation, each of the mold segment halves, not connected with each other, of a row being guided out of the molding path substantially at right angles to the direction of production at the downstream end of the molding path by means of a return device, and being returned to the upstream end of the molding path along a return path, where they are again inserted in the molding path and attached to the mold segment half leading in the direction of production, the return device being a slide with a pivot arm, a coupling member being arranged on the free end of this pivot arm for the releasable coupling to a mold segment half, and drives being provided for continuously moving the coupling member from the downstream end of the molding path to the latter's upstream end and back again, and a wedge element being disposed at the downstream end of the molding path, separating the mold segment halves and cooperating with slopings disposed on the halves.

2. Background Art

An apparatus of the generic type known from U.S. Pat. No. 4,212,618 ensures that as low as possible a number of circulating mold segment halves is needed. The mold segment halves are separated from each other on the return path and returned at such an average speed that the return period for each mold segment half is less than the time needed by a half to move on the molding path by a distance corresponding to its length. This results in the saving of more than fifty percent of the mold segment halves as compared to conventional apparatuses of continuously circulating mold segment halves. There is but one mold segment half on each return path, which is piloted back to the upstream end of the molding path by continuous, accelerated and again decelerated motion. Owing to the low number of mold segment halves needed, the apparatus can be retrofitted for another diameter of pipe rapidly and at little expense, which is important in particular for pipes of extreme diameters, taking into account that in general only comparatively small quantities of such pipes are produced, there being little sense in preparing an entire apparatus for the manufacture of this pipe diameter. Such an apparatus will also provide for saving in the manufacture of special types of pipes as well as in the manufacture of transition pieces, sockets etc, these special types too only requiring a very limited number of the expensive mold segment halves.

U.S. Pat. No. 4,325,685 discloses an apparatus for the production of corrugated pipes of thermoplastic plastics, in which individual mold segment halves revolve continuously on two closed paths, two mold segment halves joining on a molding path to form a mold segment, and mold segments lying close by close to form a mold, in which a thermally plastic tube discharged by the injection head of an extruder or an injection-molding machine is molded to form a corrugated pipe. The individual mold segment halves have several different profiles, of which one at a time can be put into function. To this end, the mold segment halves are disposed on supports for displacement at right angles to their direction of movement and are moved into their working position by a shunt system. In this way even such mold segment halves can be engaged that mold a socket and/or a spigot of a pipe.

An apparatus for the manufacture of corrugated pipes of thermoplastic plastics is known from DE-G. 93 11 140 U1, in which the mold segment halves, contiguous by twos, are conveyed on a molding path by a driving pinion, which engages with a tooth profile on the lower side of the mold segment halves. The conveyance back is likewise effected by pinions, which are drivable to move sidewise, the mold segment halves thus being movable from the molding path to a return path and from the return path back again to the molding path. Subsequent to the pinions of sidewise conveyance, the return paths are provided with parking stations for mold segment halves that can be inserted in the return paths by their own drives. If a pair of mold segment halves, for instance for the molding of sockets and/or spigots on the pipe to be produced, is to be added to the molding path, then the corresponding additional mold segment halves are inserted in the return path and moved to the upstream end of the molding path, where they are added to the molding path. Simultaneously, a pair of mold segment halves, after being conveyed sidewise, is removed from the molding path at the downstream end of the molding path and prior to entering the return path, is moved into the parking position. If the additional mold segment halves are to be removed from the circuit, then the parked mold segment half is inserted in the respective return path directly prior to these additional mold segment halves being conveyed sidewise away from the molding path, so that the additional mold segment half can be parked again. As a result, the molding path has always the same length only such additional mold segment halves can be inserted that have exactly the length of the usual mold segment halves for the production of the corrugated pipe.

SUMMARY OF THE INVENTION

It is the object of the invention to embody an apparatus of the generic type such that additional mold segment halves can be inserted or, respectively, removed from the molding path at low constructional requirements.

According to the invention this object is attained in that the wedge element is displaceable parallel to the direction of production by means of a displacing drive, and in that grab equipments are provided, which are displaceable counter to the direction of production by means of a supply and removal drive and by means of which one additional mold segment half at a time can be moved to the downstream end of the molding path, removed from the latter in the direction of production and moved into a parking position, and in that the coupling member is movable by means of the drives into two positions at the downstream end of the molding path, the distance of which positions from each other in the direction of production corresponds to the length of the mold segment halves in the direction of production. As a result of the measures according to the invention, additional mold segment halves, for instance for the molding of a socket and/or a spigot within the continuously produced pipe, are moved in front of the downstream end of the mold with their front facing the latter, and thus being inserted in the normal return cycle. The mold segment halves molding the normal corrugated pipe keep on circulating, i.e. the molding path is prolonged by the insertion of additional mold segment halves and, respectively shortened by their removal from the, molding path. In this way it is also possible to insert additional mold segment halves, the length of which not being identical with that of normal mold segment halves. This serves to achieve high flexibility of the apparatus.

Further features, advantages and details of the invention will become apparent from the ensuing description of an example of embodiment taken in conjunction with the drawing.

DESCRIPTION OF THE PREFERRED EMBODIMENT

Figure 1:
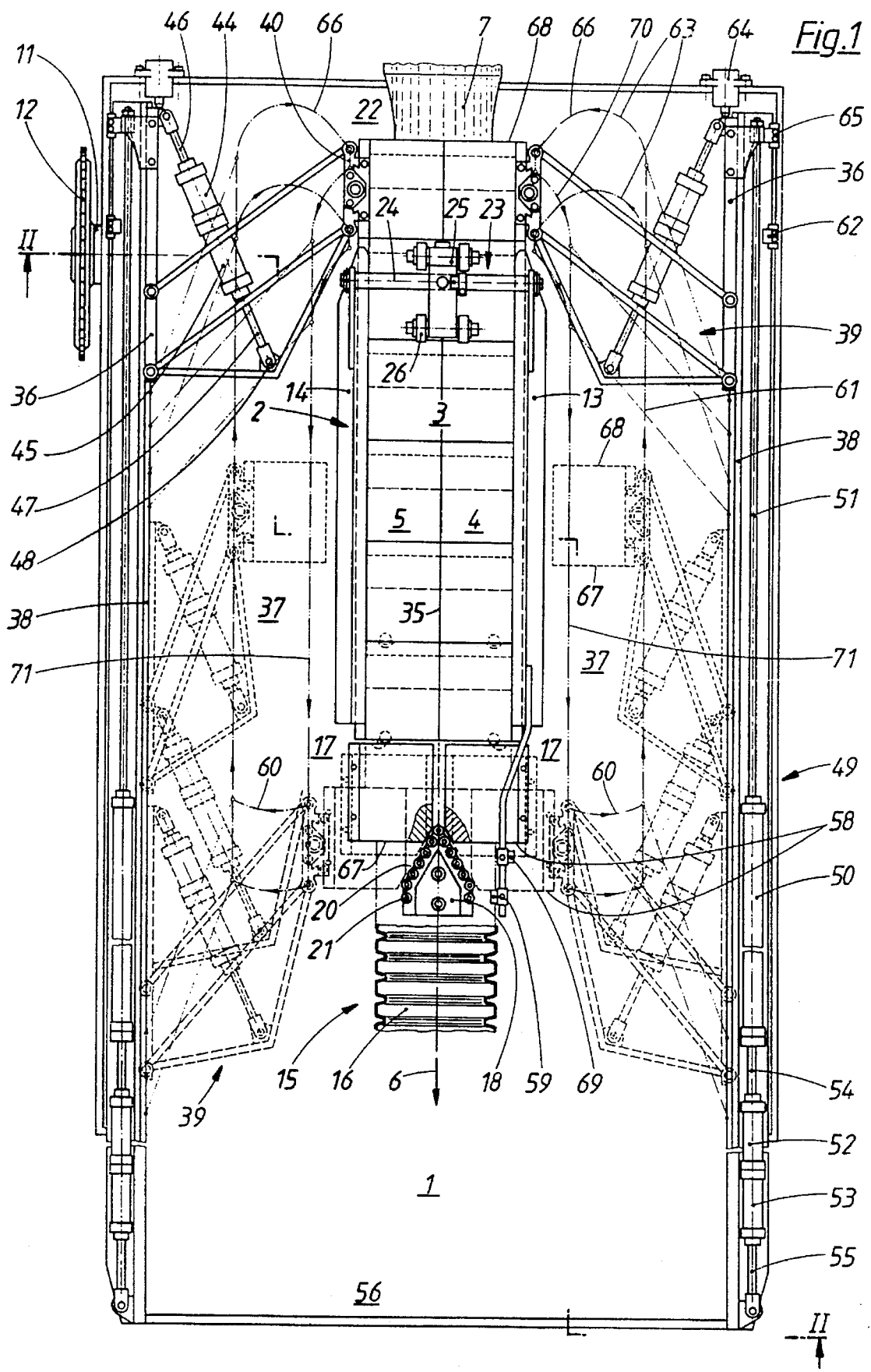
FIG. 1 is a plan view of an apparatus for the manufacture of corrugated pipes of thermoplastic plastics.

FIG. 1 illustrates an apparatus for the manufacture of corrugated pipes of thermoplastic plastics used within the scope of this invention and a portion of which is known from U.S. Pat. No. 4,212,618.

This apparatus has a base 1 with a molding path 2 disposed on it. Mold segments 3 file on this molding path 2, each consisting of two mold segment halves 4, 5. As long as the mold segment halves 4, 5 stick together by twos and as long as adjacent mold segments 3 abut to form a mold, they move straight on the base 1 in a direction of production 6. For continuously driving the mold formed by the mold segments 3, a driving pinion 8 is provided directly behind an injection head 7 of an extruder, the driving pinion 8 passing through a recess 9 in the base 1 and engaging with a tooth profile 10 formed on the respective bottom side of the mold segment halves 4, 5. The driving pinion 8 is non-rotatably disposed on a drive shaft 11 positioned underneath the base 1 and driven via a driving wheel 12 by a motor (not shown). On the molding path 2, the mold segment halves 4, 5 are pressed together by guide rails 13, 14.

A thermally plastic tube is extruded from the injection head 7 into the mold located on the molding path 2, the tube itself being molded to form a pipe 15 with transverse grooves 16 during the motion of the pipe in the direction of production, as it is known for instance from U.S. Pat. No. 3,776,679.

At the downstream end 17, opposite to the injection head 7, of the molding path 2, a wedge plate 18 is disposed on the base 1, which cooperates with slopings 19 disposed on the downstream inner edge—seen in the direction of production 6—of the mold segment halves 4, 5, so that the halves 4, 5 of a mold segment 3, when contacting the wedge plate 18, are moved apart at right angles to the direction of production 6. Of course, no guide rails 13, 14 are provided in this portion. On its wedge faces 20, the wedge plate 18 has rollers 21, which contribute to decrease the friction between the mold segment halves 4, 5 on the one hand and the wedge plate 18 on the other.

In the vicinity of the driving pinion 8, i.e. in the vicinity of the upstream end 22, adjacent to the injection head 7, of the molding path 2, a thrust bearing 23 is provided above the latter, absorbing the forces exercised by the driving pinion 8 upwards on the mold segment halves 4, 5. The thrust bearing 23 has a counter pressure axle 24, which is fixed to the guide rails 13, 14. On the counter pressure axle 24 a bearing 25 is disposed, on which pressing rollers 26 are rotatably supported, resting on the upper side of the mold segment halves 4, 5 and pressing same against the base 1. The thrust bearing 23 is of importance in particular because in the illustrated apparatus for the manufacture of the pipe 15, the depositing of the thermally plastic tube on the inside walls 27 of the mold segment halves 4, 5 is achieved in that air is sucked off the mold cavity 28 of the mold or the, mold segments 3 via channels (not shown in the drawing) formed in the mold segment halves 4, 5. This sucking off takes place via vacuum channels 29 which are formed in the base 1 and which combine with the channels formed in the mold segment halves 4, 5. The formation and arrangement of the vacuum channels in the mold segment halves 4, 5 is illustrated and specified in detail in British patent 971 021, to which reference is made for information. Since the mold segment halves 4, 5 are cooled in addition, the base 1 further comprises cooling water flow pipes 30 and cooling water return pipes 31, through which cooling water is supplied and removed. The design and the arrangement of such cooling water channels in the mold segment halves 4, 5 are illustrated and specified in U.S. Pat. No. 3,776,679, to which reference is made for information. As a result of the thrust bearing 23 pressing the mold segment halves 4, 5 on the base 1, losses of partial vacuum and cooling water are avoided.

On the outside 32 of the mold segment halves 4, 5, clamping prisms 33 are provided, to which a return device 34 can be coupled. Each of the two devices 34 arranged in mirror symmetry to the central longitudinal axis 35 of the molding path 2 has a slide 36, which is guided on a running rail 38 disposed along a return path 37. The running rail 38 is provided with a dove-tail profile, on which the slide 36 is slidably displaceable by a correspondingly adjusted recess. Of course, a roller guidance can be provided for the slide 36, which would ensure the running, reduced in friction, of the slide 36.

A pivot arm 39 formed by two parallel rods is articulated to the slide 36 and has a clamping device 40 articulated to is outer end; on the occasion of linear displacements of the slide 36 and of pivoting movements of the swivel arm 39, the clamping device 40 is always displaced parallel to itself owing to the parallel rod structure. On each clamping device 40, clamping pins 42 are supported, which are actuatable by a linear drive 41 and which engage with adjusted recesses 43 on the respective clamping prism 33, thereby producing a coupling between a return device 34 and an associated mold segment half 4 or 5.

A tandem arrangement of linear drives 44, 45, formed by pneumatic cylinders, is provided for pivoting the pivot arms 39, the free end of the piston rod 46 of the first linear drive 44 being articulated to the slide 36 in the vicinity of the latter's upstream end—seen in the direction of production 6—while the piston rod 47 of the other linear drive 45 is articulated to the pivot arm 39, namely to a support bearing 48 projecting from the pivot arm 39 in the direction of production 6.

The movement of the slide 36 in the longitudinal direction of the apparatus, i.e. parallel to the central longitudinal axis 35, takes place by means of a drive 49, which may have a pneumatically actuatable piston-cylinder drive 50 as a main element, the piston rod 51 of which is connected with the slide 36. The drive 49 may have two further pneumatically actuatable piston-cylinder drives 52, 53 arranged in a row with the piston-cylinder drive 50 and which are employed for the acceleration, retardation and damping of the movements. The piston rod 54 of the drive 52 is articulated to the drive, 50; the piston rod 55 of the drive 53 is articulated to the running rail 38 in the downstream end portion 56 of the base 1.

Whenever a clamping device 40 is not coupled with a mold segment half 4 or 5, it supports itself on the base 1 by way of a supporting roller 57.

The apparatus specified so far works as described below:

The following proceeds from the position, shown in FIG. 1, of the mold segment halves 4, 5 at the downstream end 17 of the molding path 2, which have been separated partially by means of the wedge plate 18. In this position, the leading edge 58 of the mold segment half 4 operates a switch 59, as a result of which the linear drive 41 is actuated and a locking is produced between the clamping device 40 and the clamping prism 33 of the respective mold segment half 4 or 5. By way of a usual sequence control, the linear drive 44 and the piston-cylinder drive 52 are then acted upon by compressed air such that the piston rods 46, 54 are retracted. As a result, the respective mold segment half 4 or 5 and the clamping device 40 completely move out of the molding path 2 along a curved length 60. At the end of this respective curved length 60, which is at the same time the start of a long straight length 61, parallel to the axis 35, of each return path 37, the piston-cylinder drives 50 and 53 are acted upon by compressed air such that their piston rods 51 and 55 are extracted, whereby the slides 36, with the mold segment half 4 or 5 coupled to them, are accelerated to a speed of as much as 5 m/sec and reversed along the straight length 61 to the upstream portion of the base 1 adjacent to the injection head 7. Right before the final position is reached, a switch 62 is operated, whereby the linear drives 44, 45 are acted upon by compressed air such that their piston rods 46, 47 are extracted. The switch 62 is displaceably and adjustably disposed on a guide rail 62a. As a result, the respective clamping device 40, with the mold segment half 4 or 5, coupled to it, moves along a curved length 63 toward the molding path 2. Simultaneously, a valve (not shown) of the piston-cylinder drive 52 is opened so that the latter's piston rod 54 is extracted by the inertia of the return device 34 and the coupled mold segment half 4 or 5, the mass in motion being braked by the throttling effect of the mentioned valve (not shown). The final damping and braking is made by shock absorbers 64 disposed on the base 1.

When all the piston rods 51, 54, 55 of the piston-cylinder drives 50, 52, 53 are extracted and the shock absorber is pressed in, a switch 65 adjustable on the guide rail 62a and displaceable in latter's longitudinal direction is actuated, whereby the pneumatically actuatable piston-cylinder drives 50 and 53 are acted upon by compressed air in such a way that their piston rods 51 and 55 are retracted. This results in the mold segment half 4 or 5 still coupled to the respective clamping device 40 being moved along a straight length 66 extending at an angle to the axis 35, and that until the downstream front 67 of the respective mold segment half 4 or 5, moved alongside and toward the molding path 2, tightly rests on the facing upstream front 68 of the next downstream mold segment half 4 or 5. Since the closed mold, which consists of mold segments 3, is moved ahead in the direction of production 6 with the aid of the driving pinion 8, and since there are strong frictional forces between the mold segments 3 and the base 1, which may even be augmented by the vacuum actuation mentioned above, the piston-cylinder drives 50, 53 and the linear drives 44, 45,—the latter still in the process of extraction—cannot displace the mold segments 3 forming the mold in the direction of production 6, but they can only tightly press the mold segment halves 4, 5 newly added to the molding path 2 and move them on in the direction of production 6 until the mold segment half 4 leading in the direction of production 6 operates a limit switch 69, which takes place at the beginning of the separation of the two associated mold segment halves 4, 5 leading in the direction of production 6 by the wedge plate 18. By the operation of this switch 69, the linear drives 41 and 44 are acted upon by compressed air such that the clamping pins 42 are moved out of the recess 43 of the clamping prism 33 and the piston rod 46 is retracted. In this way, the clamping device 40 is disengaged from the mold segment half 4 or 5 and then moved along a curved length 70 out of the traveling path of the clamping prisms 33 on the molding path 2. Since the piston-cylinder drives 50, 53 have already been acted upon by compressed air for their piston rods 51, 55 to be retracted, the slide 36 is moved by acceleration along a straight length 71 to take its initial position, where again two mold segment halves 4, 5, partially separated by the wedge plate 18, are coupled to it.

Figure 3:
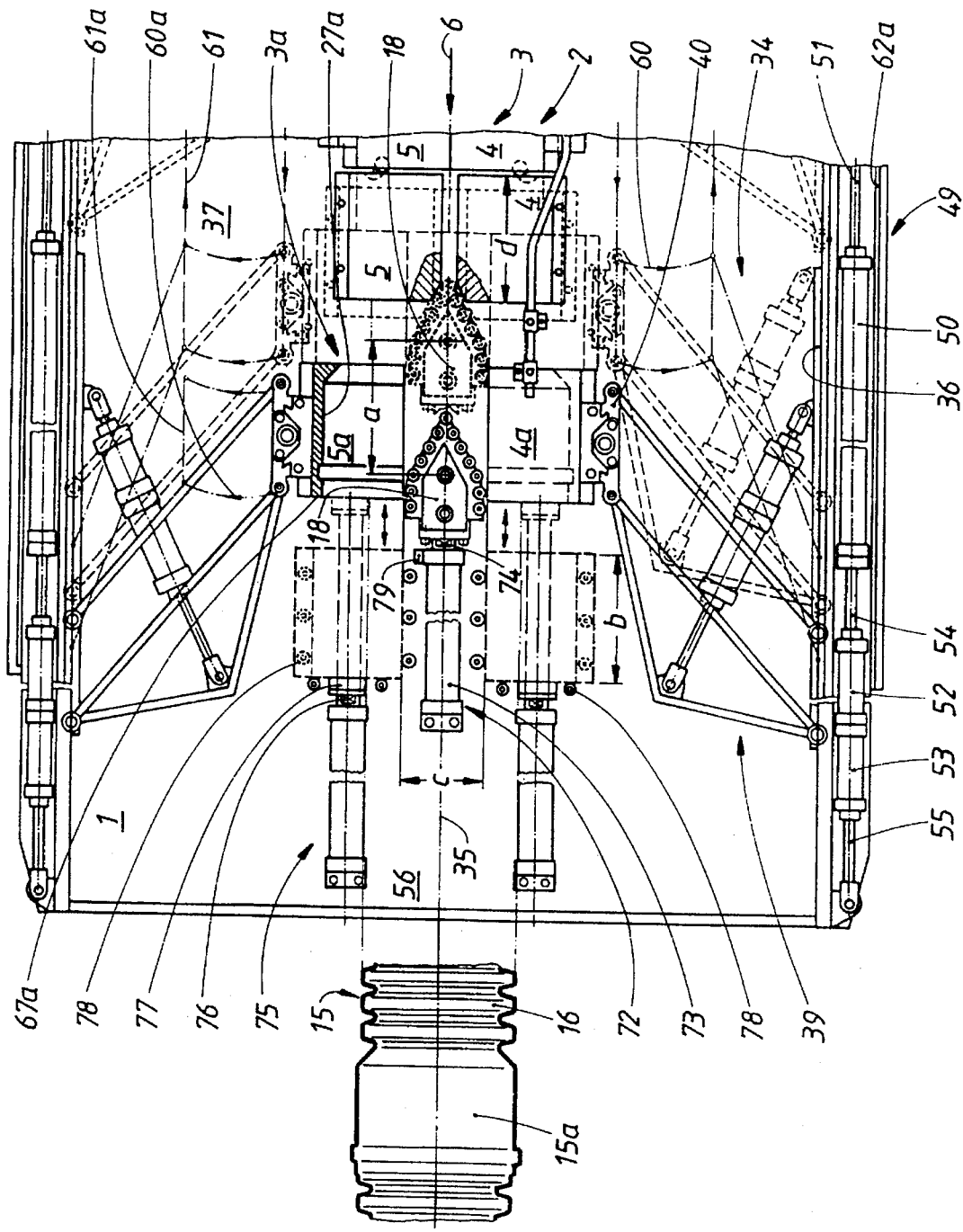
FIG. 3 is a plan view of an apparatus for the manufacture of corrugated pipes of thermoplastic plastics in an illustration on an enlarged scale as compared to FIG. 1, showing the portion of the apparatus that has been changed according to the invention as compared to the prior art.

In the embodiments known, the wedge plate is stationarily united with the base 1, for instance by screwing, whereas in the embodiment of the invention according to FIG. 3, it is joined to a displacing drive 72 in the form of a linear drive acting parallel to the axis 35, by means of which the wedge plate 18 can be moved from a position shown in dashed lines in FIG. 3 and corresponding to the position according to FIG. 1, to a position shown in solid lines in FIG. 3. In this latter position, the wedge plate 18 is displaced in the direction of production 6 toward the end portion 56 of the base 1. The distance a between these two positions of the wedge plate 18 equals the dimension b of a mold segment 3a, consisting of two halves 4a, 5a, to be additionally inserted in the molding path 2. In this case, this mold segment 3a is added to the molding path 2, which is extended by the dimension b as a result. The displacing drive 72 is formed by a pneumatically actuatable piston-cylinder drive, of which the cylinder 73 is mounted on the base 1, while the wedge plate 18 is fixed to its piston rod 74. On either side of the displacing drive 72, two supply and removal drives 75 are disposed, which act parallel to the displacing drive 72 and on the base 1, and which are also pneumatically actuatable piston-cylinder drives. On the free end of the respective piston rod 76, a grab equipment 77 is disposed for seizing a mold segment half 4a or 5a. This grab equipment 77 may be a solenoid or a magnetic holding device acting on the advancing front 67a of the mold segment half 4a or 5a. On the path of displacement of the respective grab equipment 77, guide stops 78 are provided on the base 1 along a U-shaped curve, by means of which the position of an additional mold segment half 4a or 5a is set in relation to the base 1 and thus to the molding path 2 when the piston rod 76 of the supply and removal drive 75 is retracted.

FIG. 3 also illustrates the different positions in which the return devices 34 take the mold segment halves 4, 5—as described above—at the end of the molding path 2, if no additional halves 4a, 5a are on the molding path 2. This position of the return devices 34 is shown by dashed lines in FIG. 3. The corresponding position of the return devices 34, in case an additional mold segment 3a is on the molding path 2, is shown by solid lines in FIG. 3. The curved lengths 60a, along which the mold segment halves 4, 5 and 4a, 5a, respectively, are guided outward in the case of this constellation, are also shown. The straight length 61a, by which the straight length 61 is extended, corresponds to the dimension b. This extension of the return path 37 becomes possible due to the fact that the drive 49 can be extended by different lengths. In concrete form, this can be realized in that the piston-cylinder drive 50 can be stopped in an intermediate position, in Which the piston rod is extracted by the dimension b. This is the position from which the return of the mold segment halves 4 and 5 takes place if no additional mold segment 3a is on the molding path 2. If, however, an additional mold segment 3a is on the molding path 2, then the piston rod 51 is completely retracted. The corresponding triggering takes place by way of a switch 79, which is operated by the wedge plate 18, when the piston rod 74 of the displacing drive 72 is retracted.

Figure 2:
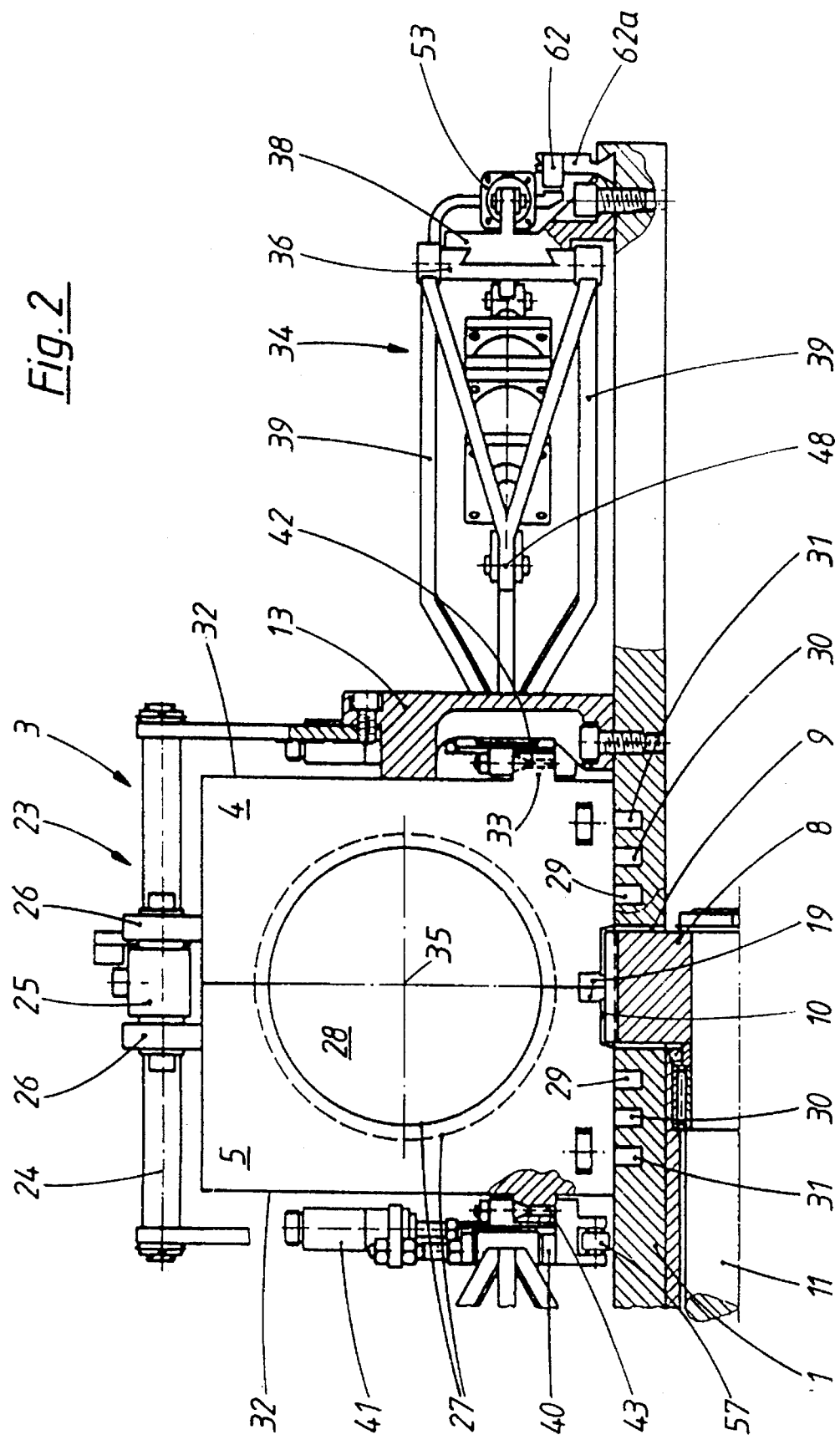
FIG. 2 is a vertical cross-section corresponding to the section line II—II of FIG. 1 of a partial illustration on an enlarged scale as compared to FIG. 1.

The insertion of an additional mold segment 3a in the molding path and, respectively, the removal of these additional mold segment halves 4a, 5a from the molding path 2 takes place as follows:

According to FIG. 3, the starting point consists in that on each grab equipment 77 of each supply and removal drive 75, an additional mold segment half 4a and 5a is in its inactive position between the guide stops 78. The piston rod 74 of the displacing drive 72 is extracted so that the wedge plate 18 is in its upstream position closer to the injection head 7, as described in detail for FIGS. 1 and 2 above. After a pair of mold segment halves 4, 5 has been guided out of the molding path 2 in the way described above and has been moved outwards along the curved lengths 60 by the return devices 34, the displacing drive 72 is acted upon by compressed air in such a way that its piston rod 74 is retracted into the cylinder 73 and the wedge plate 18 moves away from the injection head 7 by the dimension a. In this case the switch 79 is actuated, triggering an actuation of the supply and removal drives 75 by compressed air in such a way that the latter's piston rods 76 extend counter to the direction of production 6, conveying the additional mold segment halves 4a and 5a located on their grab equipments 77 toward the molding path 2, i.e. upstream. In this case their distance c from each other at right angles to the axis 35 corresponds to the distance c which the mold segment 3 halves 4,5 have from each other when they have been moved apart by the wedge plate 18. The grab equipments 77 are released and the drives 75 are acted upon by compressed air in such a way that their piston rods 76 are again retracted. By means of the switch 79, the triggering of the piston-cylinder drive 50 is changed such that the latter's piston rod 51 is completely retracted so that the return device 34 is moved into the position shown by solid lines in FIG. 3. One return device 34 at a time takes the additional mold segment half 4a or 5a, respectively, and transports it in the manner described along the curved length 60a, the straight supplementary length 61a and the straight length 61 to the start 22 of the molding path 2. When an additional mold segment 3a is inserted in the molding path 2, the latter is extended correspondingly.

If the additional mold segment halves 4a, 5a are to be removed from the molding path 2, then the displacing drive 72 is acted upon by compressed air after separation of the additional halves 4a, 5a at the end of the molding path 2, such that its piston rod 74 extends and moves the wedge plate 18 into its position closer to the injection head 7, so that the ensuing pair of mold segment halves is separated at an earlier time—as specified above. Simultaneously, the switch 79 is again operated, which triggers the described shortening of the displacement path of the piston-cylinder drive 50. Moreover, the piston rods 76 carrying the grab equipments 77 of the supply and removal drives 75 are extracted and seize the additional mold segment halves 4a, 5a to be removed from the circuit. The triggering of the drives 75 is reversed so that the piston rods 76 are retracted, moving the additional mold segment halves 4a, 5a into their parking position between the guide stops 78.

The dimension b of the additional mold segment 3a may be greater or less than the length d of the usual mold segment 3. The additional mold segment 3a may be provided for the molding of a socket 15a on the pipe 15 otherwise provided with transverse grooves 16 over its length, or for the molding of a socket 15a and, additionally, of a spigot (not shown). Taken in conjunction with the mold segment half 5a, FIG. 3 roughly outlines what the inside walls 27a of the additional mold segment halves 4a, 5a are like in such a case.

It may also be suitable to form a socket 15a and a spigot (not shown) one after the other so that when the pipe 15 is severed between the socket 15a and the spigot, pipe sections are produced, having a socket 15a at one end and a spigot at the other. Within a scope given by the length d, the pipe sections may be of arbitrary length.

What is claimed is:

1. An apparatus for the manufacture of corrugated pipes (15) of thermoplastic plastics comprising circulating mold segment halves (4, 5), which are disposed in two opposite rows subsequent to an injection head (7) and of which two all a time combine along a straight molding path (2) to form a closed hollow mold, and which, on their inside, have inside walls (27) forming a corrugation on said pipes (15), each of the mold segment halves (4, 5), not connected with each other, of a row being guided out of the molding path (2) substantially at right angles to a direction of production (6) at a downstream end (17) of the molding path (2) by a return device (34), and being returned to an upstream end (22) of the molding path (2) along a return path (37) by said return device (34), where they are again inserted in the molding path (2) and attached to the mold segment half (4, 5) leading in the direction of production (6), the return device (34) being a slide (36) with a pivot arm (39), a coupling member being arranged on a free end of this pivot arm (39) for a releasable coupling to a mold segment half (4, 5), and coupling member drives being provided for continuously moving the coupling member from the downstream end (17) of the molding path (2) to the upstream end (22) of the molding path (2) and back again and a wedge element (18) being disposed at the downstream end (17) of the molding path (2), separating the mold segment halves (4, 5) and cooperating with slopings (19) disposed on the mold segment halves (4, 5), wherein the wedge element (18) is displaceable parallel to the direction of production (6) by a displacing drive (72), and wherein grab equipments (77) are provided, which are displaceable counter to the direction of production (6) by a supply and removal drive (75) and by which one additional mold segment haft (4a, 5a) for each row at a time is movable to the downstream end (22) of the molding path (2), and removable from the downstream end (22) in the direction of production (6) and movable into a parking position, and wherein the coupling member is movable by said coupling member drives into two positions for releasably coupling the mold segment half at the downstream end (17) of the molding path (2), the distance a of which two positions from each other in the direction of production (6) corresponds to the length b of the additional mold segment half (4a, 5a) for each row in the direction of production (6).

2. An apparatus according to claim 1, wherein guide stops (78) are provided, which position the additional mold segment halves (4a, 5a) in the parking position.

3. An apparatus according to claim 1, wherein the grab equipments (77) are magnets.

4. An apparatus according to claim 1, wherein the displacing drive (72) and the supply and removal drive (75) are linear drives.

5. An apparatus according to claim 1, wherein the additional mold segment halves (4a, 5a) are provided with inside walls (27a) forming a socket (15a) on the pipe (15).

6. An apparatus according to claim 5, wherein the additional mold segment halves (4a, 5a) are provided with inside walls (28a) forming a socket (15a) and a spigot on the pipe (15).

* * * * *

UNITED STATES PATENT AND TRADEMARK OFFICE
CERTIFICATE OF CORRECTION

PATENT NO. : 5,560,941
DATED : October 1, 1996
INVENTOR(S) : Ralph-Peter Hegler and Wilhelm Hegler It is certified that error appears in the above-indentified patent and that said Letters Patent is hereby corrected as shown below:

Column 8, Line 25, delete "all" and insert --at--.

Column 8, Line 55, delete "haft" and insert --half--.

Signed and Sealed this

Thirty-first Day of December, 1996

Attest:

BRUCE LEHMAN

*Attesting Officer*     *Commissioner of Patents and Trademarks*